US011237267B2

(12) United States Patent
Lundquist

(10) Patent No.: US 11,237,267 B2
(45) Date of Patent: Feb. 1, 2022

(54) CONTINUOUS WAVE LASER DETECTION AND RANGING

(71) Applicant: Arete Associates, Northridge, CA (US)

(72) Inventor: Paul Bryan Lundquist, Longmont, CO (US)

(73) Assignee: Arete Associates, Northridge (CA)

( * ) Notice: Subject to any disclaimer, the term of this patent is extended or adjusted under 35 U.S.C. 154(b) by 287 days.

(21) Appl. No.: 16/601,766

(22) Filed: Oct. 15, 2019

(65) Prior Publication Data

US 2020/0057159 A1 Feb. 20, 2020

Related U.S. Application Data

(63) Continuation of application No. 15/342,374, filed on Nov. 3, 2016, now Pat. No. 10,473,786.

(51) Int. Cl.
*G01S 17/32* (2020.01)
*G01S 7/481* (2006.01)
*G01S 17/46* (2006.01)
*G01S 17/42* (2006.01)

(52) U.S. Cl.
CPC ............ *G01S 17/32* (2013.01); *G01S 7/4817* (2013.01); *G01S 17/42* (2013.01); *G01S 17/46* (2013.01)

(58) Field of Classification Search
None
See application file for complete search history.

(56) References Cited

U.S. PATENT DOCUMENTS

2005/0225742 A1* 10/2005 Buermann ............ G01S 17/46
356/4.01

* cited by examiner

*Primary Examiner* — Hovhannes Baghdasaryan
(74) *Attorney, Agent, or Firm* — FisherBroyles, LLP; Gregory T. Fettig

(57) ABSTRACT

Systems and methods herein provide for Laser Detection and Ranging (Lidar). In one embodiment, a Lidar system includes a laser operable to propagate continuous wave (CW) laser light and a scanner operable as a transmitter and a receiver for the CW laser light. The Lidar system also includes a detector for determining a range to a target based on displacement of the CW laser light received by the receiver. The displacement of the CW laser light is proportional to an angular velocity of the scanner.

20 Claims, 11 Drawing Sheets

CONTINUOUS WAVE LASER DETECTION AND RANGING

CROSS REFERENCE TO RELATED APPLICATIONS

This patent application is a continuation patent application claiming priority to, and thus the benefit of an earlier filing date from, U.S. patent application Ser. No. 15/342,374 (filed Nov. 3, 2016), which claims priority to U.S. Provisional Patent Application No. 62/251,591 (filed Nov. 5, 2016), the entire contents of each of which are hereby incorporated by reference.

BACKGROUND

Light Detection and Ranging, or "Lidar" (also referred to as Laser Detection and Ranging (LADAR)) has typically involved propagating a pulse of laser light to an object and measuring the time it takes for the pulse to scatter and return from the object. Typically, a Lidar system comprises a laser that fires pulses of laser light at a surface. A sensor on the Lidar system measures the amount of time it takes for each pulse to bounce back. Since, light moves at a constant and known speed (~3×10$^8$ meters per second in air), the Lidar system can calculate the distance between itself and the target.

Conventional Lidar systems accumulate statistics with multiple laser pulses to determine the range to a target. These systems typically employ a constant pulse or code repetition rate. And, the pulse or code repetition time can generally not be less than the round-trip time of flight of the laser pulse to the target. Otherwise, the conventional Lidar system produces range ambiguity.

So, in many instances, conventional Lidar systems modulate laser pulses prior to transmitting it into a region of interrogation. The signal is scattered off hard targets and/or volumetrically distributed scatterers, such as molecules or other particles. And, the time of flight delay is measured by detecting the delay in the modulation of the received signal.

Generally, the pulse modulations are necessary but often result in inefficient use of power and expensive laser architectures, such as those employing Q-switched lasers. Additionally, if signals are received from multiple ranges (e.g., if an extended volume of distributed scatterers are sensed), signals scattered from near ranges may be much stronger than signals scattered from far ranges. This places a burden on the dynamic range of the conventional Lidar system and can limit detection performance. For example, if the Lidar system is tuned to detect far range targets, saturation from near range return signals and temporal tails in the detector response may overwhelm the far range signals. And, if the system is tuned to observe near range targets, far range signals may be beneath the noise floor making detection of farther targets difficult if not impossible.

Another disadvantage of conventional Lidar systems is the processing that may be required for detection, especially within a cluttered environment. The waveform of the detected signal needs to be processed to determine a delay relative to the transmitted waveform. When signals from multiple ranges are to be detected within the received waveform, the conventional Lidar system needs to isolate multiple delayed copies of the signal modulation so as to distinguish between the targets, which results in additional processing.

And, in applications where small objects are detected within a large solid angle search area, laser pulses need to completely fill the volume, resulting in high pulse repetition frequencies (PRF's), high laser power, or lower scan rates. If scan rates result in higher repetition rates, the time between pulses may be higher than the round trip time-of-flight for laser pulses to the more distant targets. In other words, multiple laser pulses will be in the air at any given point in time. And, more complex encodings on the laser signal may be needed so that the detector can determine which laser pulse it is receiving.

SUMMARY

Lidar systems and methods are presented herein. In one embodiment, a Lidar system includes a laser operable to propagate continuous wave (CW) laser light and a scanner operable as a transmitter and a receiver for the CW laser light. The Lidar system also includes a detector for determining a range to a target based on displacement of the received CW laser light. The displacement of the received CW laser light is proportional to an angular velocity of the scanner.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

Figure 1:
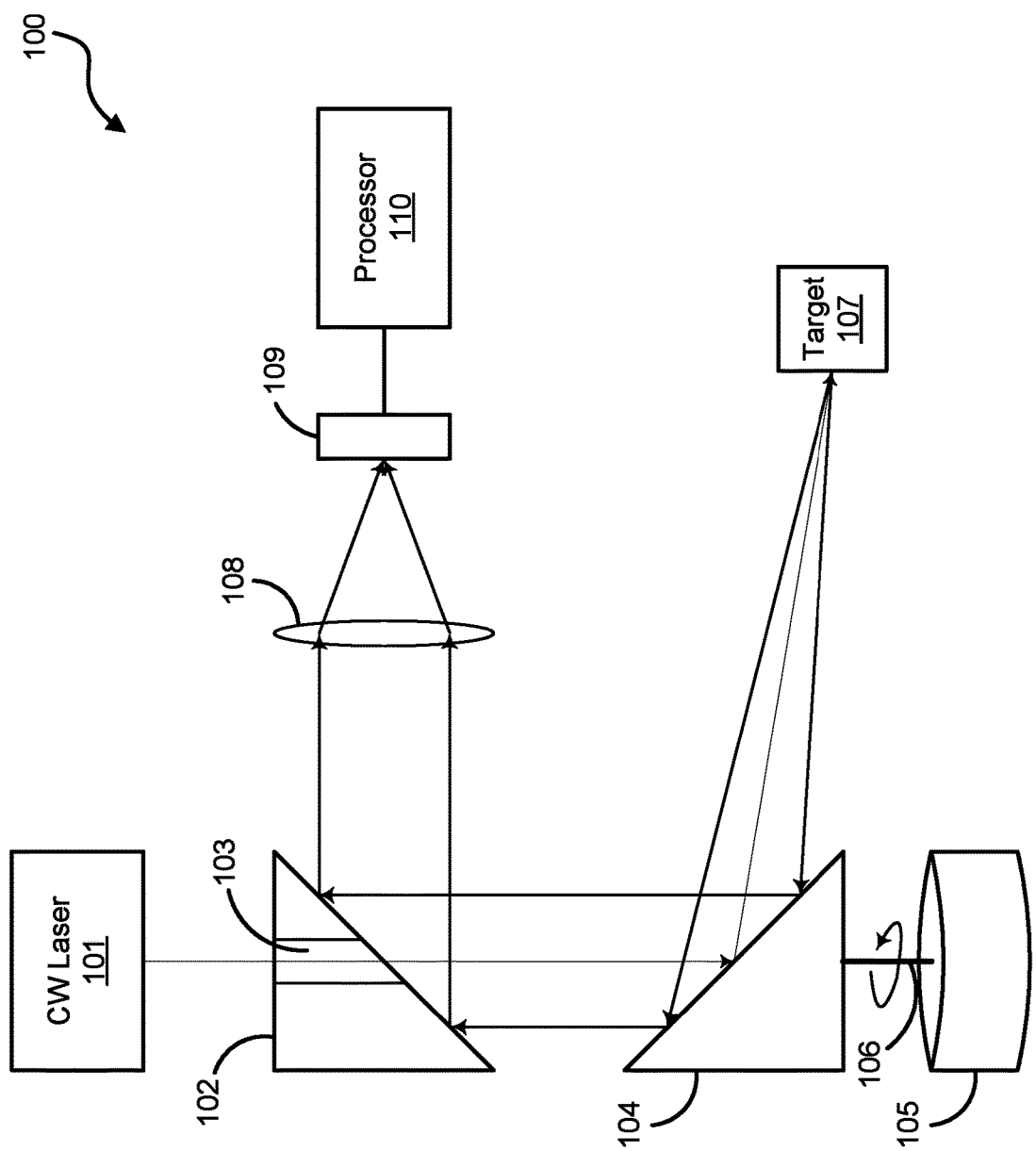
FIG. 1 is a block diagram of an exemplary CW Lidar system.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

FIG. 1A is a block diagram of an exemplary CW Lidar system 100. The Lidar system 100 includes a CW laser 101 operable to propagate CW laser light. The Lidar system 100, in this embodiment, also includes a reflective element 102 having an aperture 103 through which the CW laser light propagates during transmission. The CW Lidar system 100 also includes another reflective element 104 configured with an axle 106 and a scanning motor 105. The scanning motor is operable to rotate the reflective element 104 about the axle 106 to scan the CW laser light of the CW laser 101 towards one or more targets 107 scattered about.

The rotating reflective element 104 is also operable to direct backscattered CW laser light from the target 107 to the reflective element 102, which in turn directs the backscattered CW laser light to a detector 109 (e.g., through a focusing element 108, such as a lens). The CW laser light 101 is then processed by a processor 110 to determine a range of the target 107 based in part on an angular velocity of the reflective element 104. It should be understood by one skilled in the art that the rotating reflective element 104 may be equivalently replaced with any element that redirects light and can be rotated. For example the rotating reflective element 104 could be functionally replaced with a rotating diffractive element or a rotating refractive element.

Based on the forgoing, the CW laser 101 is any device or system operable to generate and propagate CW laser light. Examples of such a laser include low powered lasers, such as laser pointers. However, intensity of the CW laser 101 is a matter of design choice and may depend on the range of a target 107 being sensed. The reflective element 102 is any device or system operable to reflect the backscattered laser light from the target 107 to the detector 109. Examples of the reflective element 102 include wedge mirrors, off-axis parabolic (OAP) mirrors, and the like. The detector 109 is any device or system operable to receive CW laser light and convert the laser light into an electronic signal for processing by the processor 110. Examples of the detector include digital cameras, photon counters, and photo detector arrays configured from PIN detectors, Avalanche Photo Detectors (APDs), Single Photon Avalanche Detectors (SPADS), Complementary Metal Oxide Semiconductors (CMOS), Position Sensitive Detectors (PSDs), or the like.

The reflective element 104 is any device or system operable to direct the CW laser light to the target 107 as the reflective element 104 rotates about an axis of the axle 106. Examples of the reflective element 104 include wedge mirrors, off-axis parabolic (OAP) mirrors, and the like. The scanning motor 105 is any device or system operable to rotate the reflective element 104 about the axis of the axle 106. The rotational speed (i.e., the angular velocity) of the scanning motor 105 is selected as a matter of design choice based on, for example, desired range resolution of the targets, intensity of the CW laser light, and the like. Examples of relatively simple and cost effective motors include router motors and the like. However, more sophisticated motors may be selected based on desired stability and mounting mechanisms.

The processor 110 is any device, system, software, or combination thereof operable to process electronic signals from the detector 109 to determine a range of the target 107 based on the angular velocity of the scanning motor 105. One exemplary computing system operable to perform such processing is shown and described in FIG. 9. Examples of the target 107 include hard targets (e.g., planes, cars, people, and other objects) and soft targets (e.g., clouds and other vapors).

Figure 2:
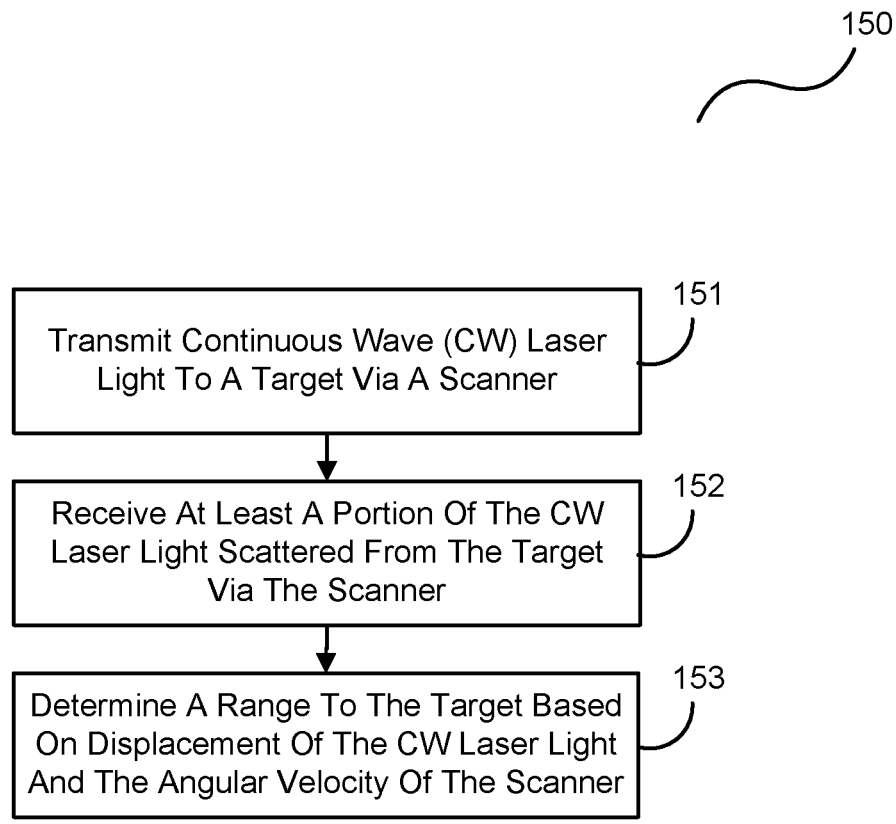
FIG. 2 is a flowchart illustrating an exemplary process of the CW Lidar system of FIG. 1.

With these features in mind, FIG. 2 is a flowchart illustrating an exemplary process 150 of the CW Lidar system of FIG. 1. In this embodiment, the CW laser 101 transmits CW laser light to one or more targets 107 via a scanner configured from the reflective element 104, the motor 105, and the axle 106, in the process element 151. At least a portion of the CW laser light scattered from the target 107 is received by the scanner, in the process element 152. For example, as the CW laser light of the CW laser 101 propagates through aperture 103 of the reflective element 102, the laser light reflects off the reflective element 104 towards the target 107. At least a portion of that CW laser light is backscattered from the target 107 towards the reflective element 104.

Since the reflective element 104 is spinning about the axis of the axle 106, the backscattered CW laser light from the target 104 impinges with an angle on the reflective element 104 that differs from the angle with which the CW laser light is transmitted from the reflective element 104. In this regard, the received CW laser light is detected by the detector 109 and the processor 110 determines a range to the target 107 based on a resultant displacement of the received CW laser light and an angular velocity of the scanner, in the process element 153. In other words, the processor 110 may be operable to determine a range to the target 107 based on a displacement of the received CW laser light with respect to the transmitted CW laser light according to the angular velocity of the scanner.

Figure 3A:
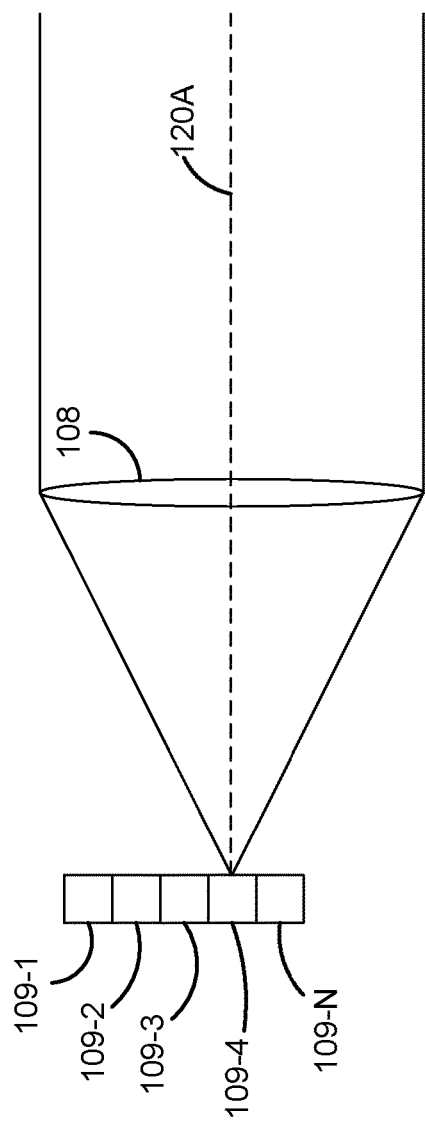
FIGS. 3A, 3B, and 4 illustrate displacement calculations based on angular velocity of a scanner of the CW Lidar system.
Figure 3B:
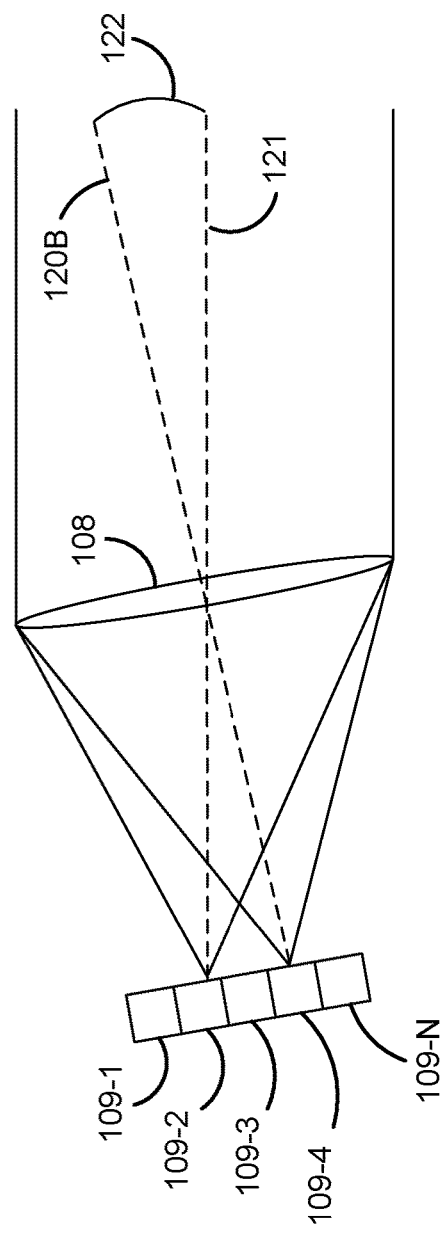
Figure 4:
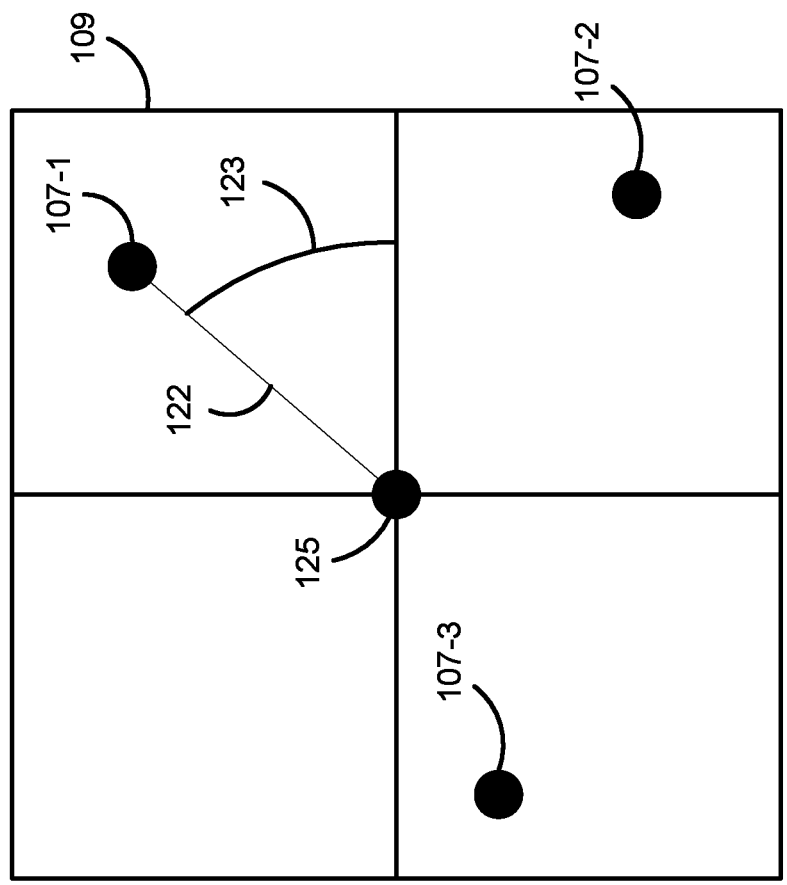

To illustrate, FIGS. 3A, 3B, and 4 show exemplary displacement calculations based on angular velocity of a scanner (e.g., scanning motor 105, axle 106, and reflective element 104). FIG. 3A illustrates a non-rotational embodiment where the CW laser light would be transmitted to a target and received by a detector element 109-4 of a detector array (e.g., the detector 109) having a plurality of detector elements 109-1-109-N (where the reference number "N" represents an integer greater than "1" and not necessarily equal to any other "N" reference number designated herein). This embodiment serves as a reference for when the reflective element 104 is rotating to illustrate how the distance to the target can be calculated. For example, the distance to the target 107 in FIG. 3A would typically be calculated based on the time-of-flight of the CW laser light to the target 107 and from the target 107 along the ray line 120A as follows: d=τc/2, where d is the distance to the target 107 and c is the speed of light (~3×10$^8$ meters per second), and τ is the time-of-flight.

However, as illustrated in FIG. 3B, when the scanning motor 105 rotates the reflective element 104 at a certain angular velocity, the received laser light impinges a different detector element 109-2 of the detector array (e.g., a different pixel), as illustrated with the ray line 121. Ray line 121 in FIG. 3B represents the light coming from the target 107 that was illuminated at an earlier time but, due to the time delay from the speed of light, is entering the focusing element 108. Thus, the ray line 121 indicates where the target 107 will come to focus. Ray line 120B in FIG. 3B is a reference to show the angular displacement 122 due to rotation of the imaging system.

This angular displacement of the received laser light is attributable to the angular velocity of the scanner and can be calculated based on the angular displacement 122 of the ray lines 120B and 121 as follows:

$$\Delta\theta = \frac{2r_1}{c}\eta,$$

where $\Delta\theta$ is the angular displacement 122, $r_1$ is a range to the target 107, and $\eta$ is the angular velocity of the scanner. And, if the receiver portion of the Lidar system 100 has a focal length f, the rotation results in a spatial shift $\Delta x = f\Delta\theta$ in the position where the received laser light comes to focus on the image plane of the detector array 109-1-109-N. Thus, the displacement on the image plane is proportional to the range ($r_1$) of the target 107 as follows:

$$\left(\Delta x = \left(\frac{2f\eta}{c}\right) r_1 \right).$$

More specifically, illumination at the image plane of the detector 109 has a displacement distance $\Delta x$ (e.g., the distance between the detector elements 109-4 and 109-2) when the sensor is oriented at an angle $\theta_{sensor}$ corresponding to scatter at a location ($r_{scat}$, $\theta_{scat}$) in polar coordinates. This location $$(r_{scat}, \theta_{scat}) = \left(\frac{\Delta x c}{2f\eta}, \theta_{sensor} - \frac{\Delta x}{f}\right),$$

where f is the focal length of the focusing element 108, and $\theta_{sensor}$ is a rotated angle of the detector plane 109 due to the change in position of the reflective element 104 caused by the rotating scanning motor 105.

The range resolution for distant objects may be given as:

$$\Delta r_{res} \approx \frac{\Delta x_{PSF} \cdot c}{2f\eta},$$

where $\Delta x_{PSF}$ is the point spread function of the detector 109. Relatively high rotation rates $\eta$ may be used to produce shorter distance range resolutions. For example, the range resolution for nearer objects may be degraded, unless the focal length of the receiver is modified to produce a sharp focus (e.g., via the focusing element 108). By rotating the scanning motor 105 at a faster rate, the need for modifying the focal length is reduced.

Returning to FIG. 1, the reflective element 102 is generally static in position. Thus, the CW laser 101 propagates the CW laser light through the aperture 103 of the reflective element 102 onto a rotating reflective element 104, which in turn directs the CW laser light to one or more targets 107 (i.e., scatterers) within a generally conical scan pattern. Although, the invention is not intended to be limited to a conical scan pattern as the Lidar system 100 may be operable to include the case of a flat circular scan pattern, generally depending on the configuration of the reflective elements 102 and/or 104.

In any case, signal returns arrive from the target 107 and are reflected from the rotating reflective element 104 to the static reflective element 102 after which it is imaged onto a focal plane of the detector 109 and then processed by the processor 110. Using this configuration, the range-dependent radial displacements at the focal plane of the detector 109 rotates at the angular rate equal to the angular rate of the rotating reflective element 104, resulting in a scattering distribution similar to that illustrated in FIG. 4.

In this two-dimensional image, the illumination displacement from a central location 125 in the plane of the detector 109 is proportional to the range of the scatterer (i.e., reflections of the CW laser light from the target 107). The polar angle of the illumination within the plane is roughly equal to the angle of the rotating reflective element 104 when the detection was made. The polar angle for the scattering distribution is approximately equal to the angle of the sensor (i.e., the received CW laser light) when the detection is made, but it may include a relatively small correction. For example, a scatterer (target 107-1) positioned at a range and polar angle $r_{scat}$ and $\theta_{scat}$ would result in an image at polar coordinates, $$r_{det} = \left(\frac{2f\eta}{c}\right) r_{scat}$$

(reference number 122) and $$\theta_{det} = \theta_{scat} + \frac{r_{scat}\eta}{c}$$

(reference number 123) on the image plane of the detector 109. Since the factor $$\frac{r_{scat}\eta}{c}$$

is usually quite small, detected light at the image plane can be simply interpreted as a two-dimensional image of the CW laser 101 scanned cone (or plane if the cone angle is $\pi/2$). Generally, the detector 109 may be configured to have integration times exceeding the single rotation period of the rotating mirror. In such a configuration, the pixels can accumulate signal from multiple rotations prior to signal digitization enabling an elegant analog method for signal averaging.

Figure 5:
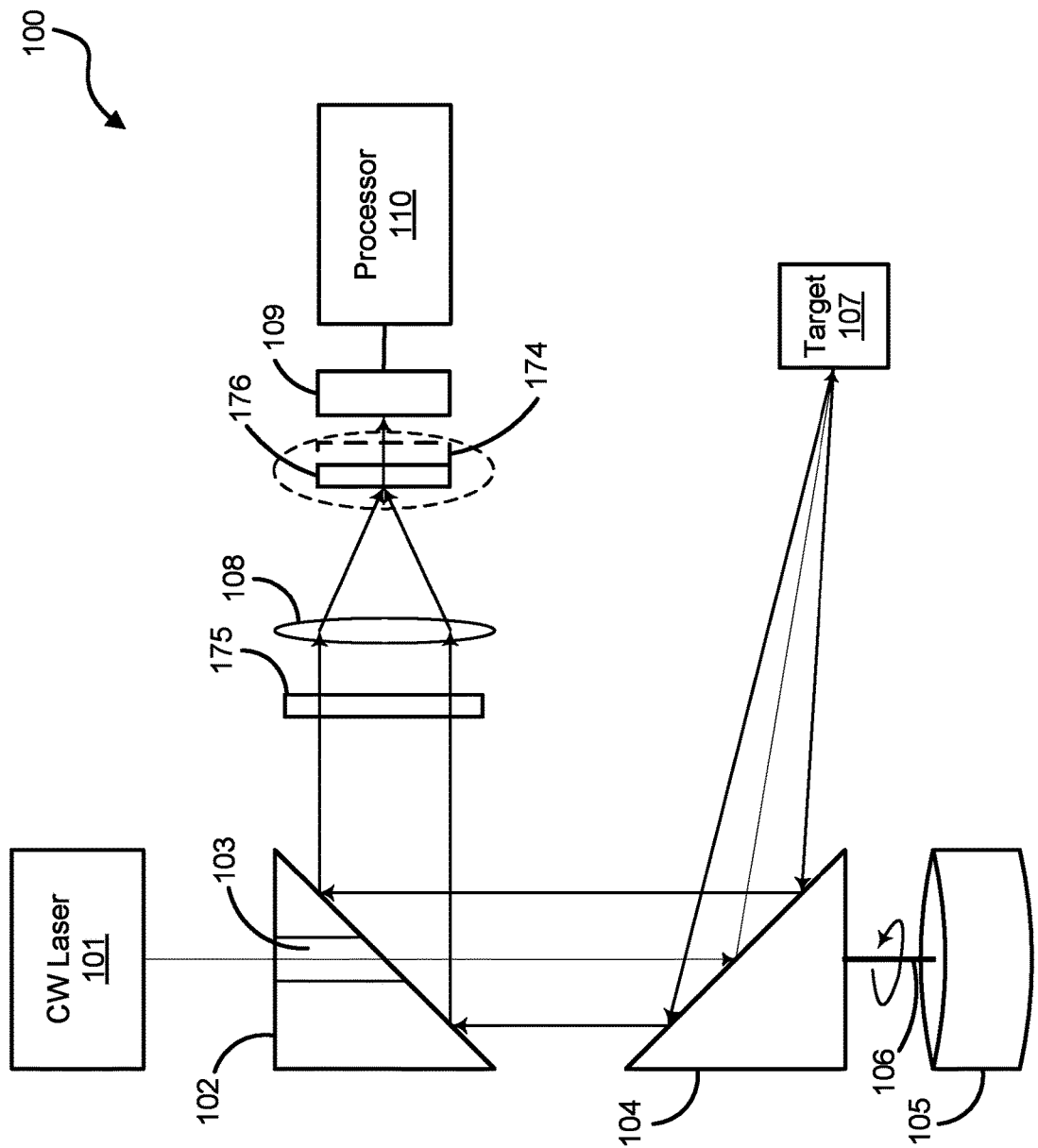
FIG. 5 is a block diagram of another exemplary CW Lidar system.

Generally, background light collecting on the image plane of the detector 109 can be a relatively large source of noise that may limit the Lidar system 100's capability to sense weaker, more distant targets 107. However, the ability to sense these weaker, more distant targets 107 can be improved with a rotating reticle and/or a filter. FIG. 5 illustrates an embodiment with a rotating reticle 176 and a filter 175 that may reduce background signals on the detector 109. In this embodiment, the filter 175 (e.g., a spectral band-pass filter or line filter) assists in removing light that is inconsistent with the illumination of the CW laser 101 and its backscatter. For example, the filter 175 may be a spectral line pass filter that blocks light with wavelengths that differ from the wavelength(s) associated with the CW laser light of the CW laser 101.

The rotating reticle 176 is spun at the image plane of the detector 109 with a rotation that is synchronized to the rotation of the reflective element 104. The rotating reticle 176 may be configured with a gradient filter 174 (e.g., a radially dependent transmission gradient filter). In such an embodiment, the gradient filter 174 is placed at the image plane (i.e., near the same place as the detector 109 and the rotating reticle 176). The purpose of the gradient filter 174 is to reduce the light from near range targets so that the gain can be increased without saturating the detector 109. That is, near range returns generally have more intense illumination. By filtering off the near range returns and increasing the gain on the imager (i.e., the detector 109), farther range targets can be observed. The gradient filter 174 may be a static element configured over the image plane of the focusing element 108 near the detector 109. Alternatively or additionally, the gradient filter 174 may be integrated within the spinning reticle 176.

Figure 6B:
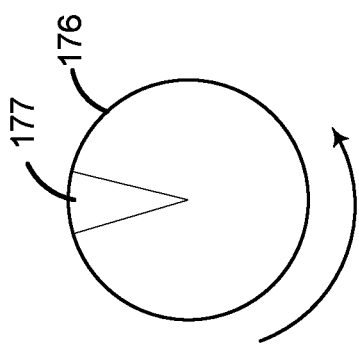
FIGS. 6A and 6B illustrate exemplary rotating reticles operable with the CW Lidar system.
Figure 6A:
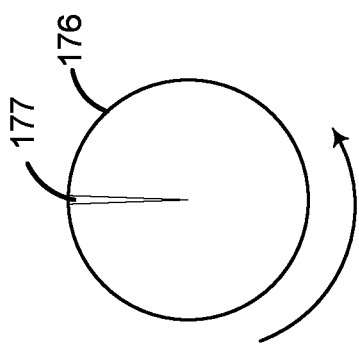

The reticle 176 may also be configured with a central slit aperture 177 that allows light displaced along a line to pass to the detector plane 109, as illustrated in FIG. 6A. Since, at any given point in time, the range dependent displacement of the imaged illumination is along a line passing through a central point on the image plane of the detector 109, the reticle 176 allows a return signal to be detected while blocking the rest of the plane of the detector 109 from background illumination. The slit aperture 177 may be a straight slit for sensors with long ranges. However, the slit aperture 177 may have a shape that is optimized to account for the angular rotation correction in the received polar angle at the plane of the detector 109 (e.g. the previously mentioned $$\frac{r_{scat} \eta}{c}$$

term in the angular mapping to the image plane).

In another embodiment, the radial dependence of the transmissions through the spinning reticle 176 may be controlled by the shape of the slit aperture 177 of the reticle 176. For example, at locations near the center of the spinning reticle 176, the slit aperture 177 is configured thinner so less light is allowed to pass, while at larger radii, the slit aperture 177 is wider so a larger proportion of the light is permitted to pass, as illustrated in FIG. 6B. In one embodiment, the slit aperture 177 is dynamically controllable to change the size of the slit aperture 177 so as to tune the Lidar system 100 for different range dependent responses (e.g., to adapt the amount of near range signal that is detected in response to the received far range signal).

Generally, with the embodiments illustrated herein, the CW laser 101, the reflective element 102, the focusing element 108, the detector 109, and the processor 110 are static in relationship with respect to the rotating reflective element 104. And, the reflective element 104 can be configured to be relatively light weight and well balanced to obtain higher rotation speeds and enable finer range resolution. Although, other components of the Lidar system 100 or the Lidar system 100 in its entirety may be configured to rotate.

Figure 7:
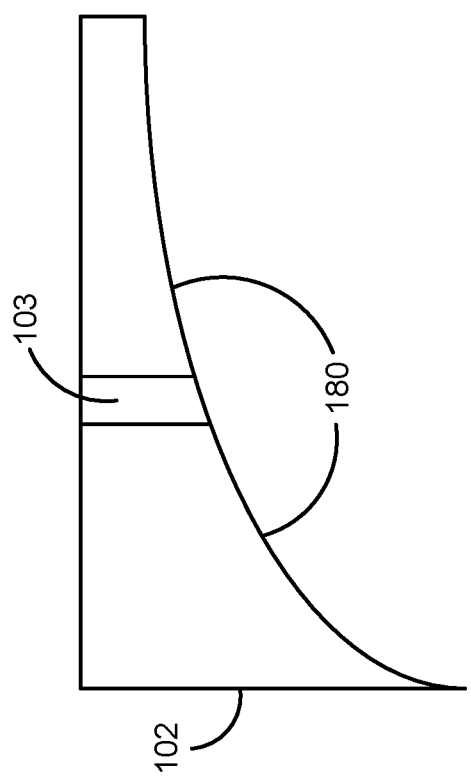
FIG. 7 is a block diagram of an exemplary Off-Axis Parabolic mirror operable with the CW Lidar system of FIG. 1.
Figure 8B:
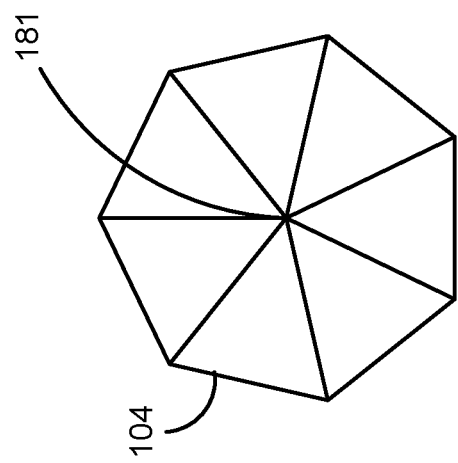
FIGS. 8A and 8B are block diagrams of a polygonal mirror configured with a scanner of the CW Lidar system.
Figure 8A:
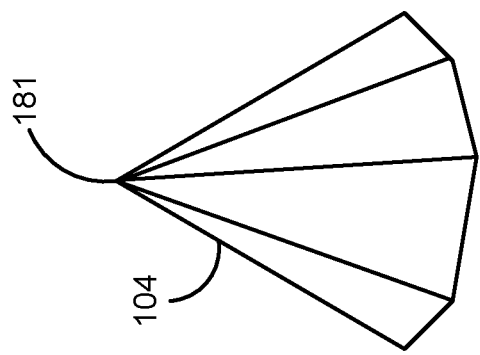

In another embodiment, the reflective element 102 may be an OAP mirror having a parabolic shape 180, as illustrated in FIG. 7. Again, the reflective element 102 is stationary and includes an aperture 103 through which the laser beam of the CW laser 101 passes. Additionally, the rotating reflective element 104 may be configured as a rotating "wedge" mirror having a polygonal/pyramidal shape, as illustrated in FIGS. 8A and 8B. Such a pyramidal scanner may be used to provide multiple simultaneous beam lines. For example, the use of multiple beam lines (or "spokes") can be used to provide a more rapid sensing sweep.

Figure 9:
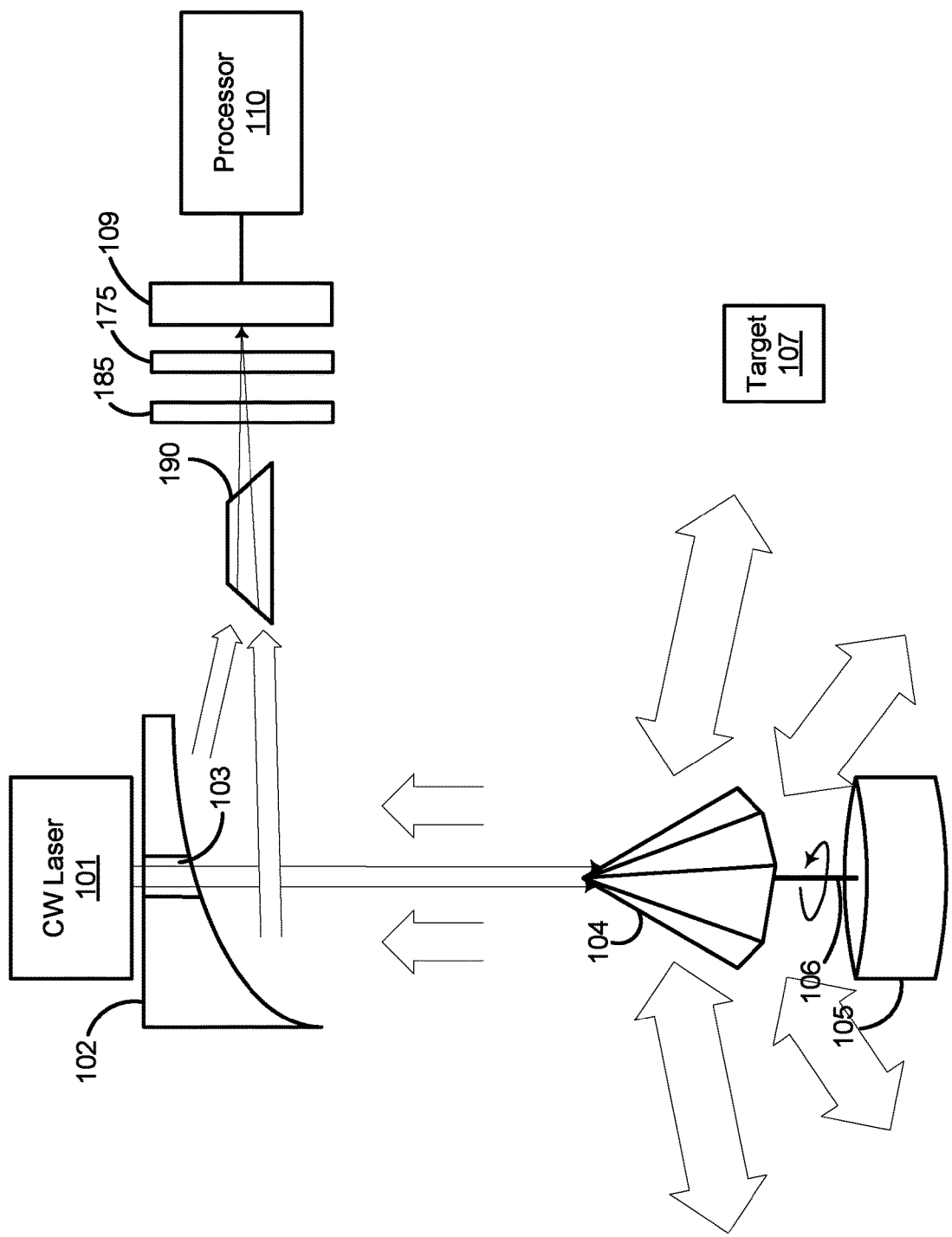
FIG. 9 is a block diagram of another exemplary CW Lidar system.

In such an embodiment, the laser beam from the CW laser 101 is generally centered on the apex 181 of the pyramidal reflective element 104, so that portions of the beam are incident on the different facets of the reflective element 104 and are directed along each of the beam spokes, as illustrated in FIG. 9. A dove prism 190 is inserted between the OAP reflective element 102 and rotated (e.g., at half the speed of the pyramidal reflective element 104) so that range displacement line images for each of the beam spokes are stationary. For example, a time dependent signal for each of the pixels in the detector plane 109 is generally needed to determine an angle of a received signal. However, the rotating dove prism 190 removes the need for the rotating reticle 176 and enables use of detection pixels that are orthogonal to displacement line images for other information to be gathered.

Figure 10:
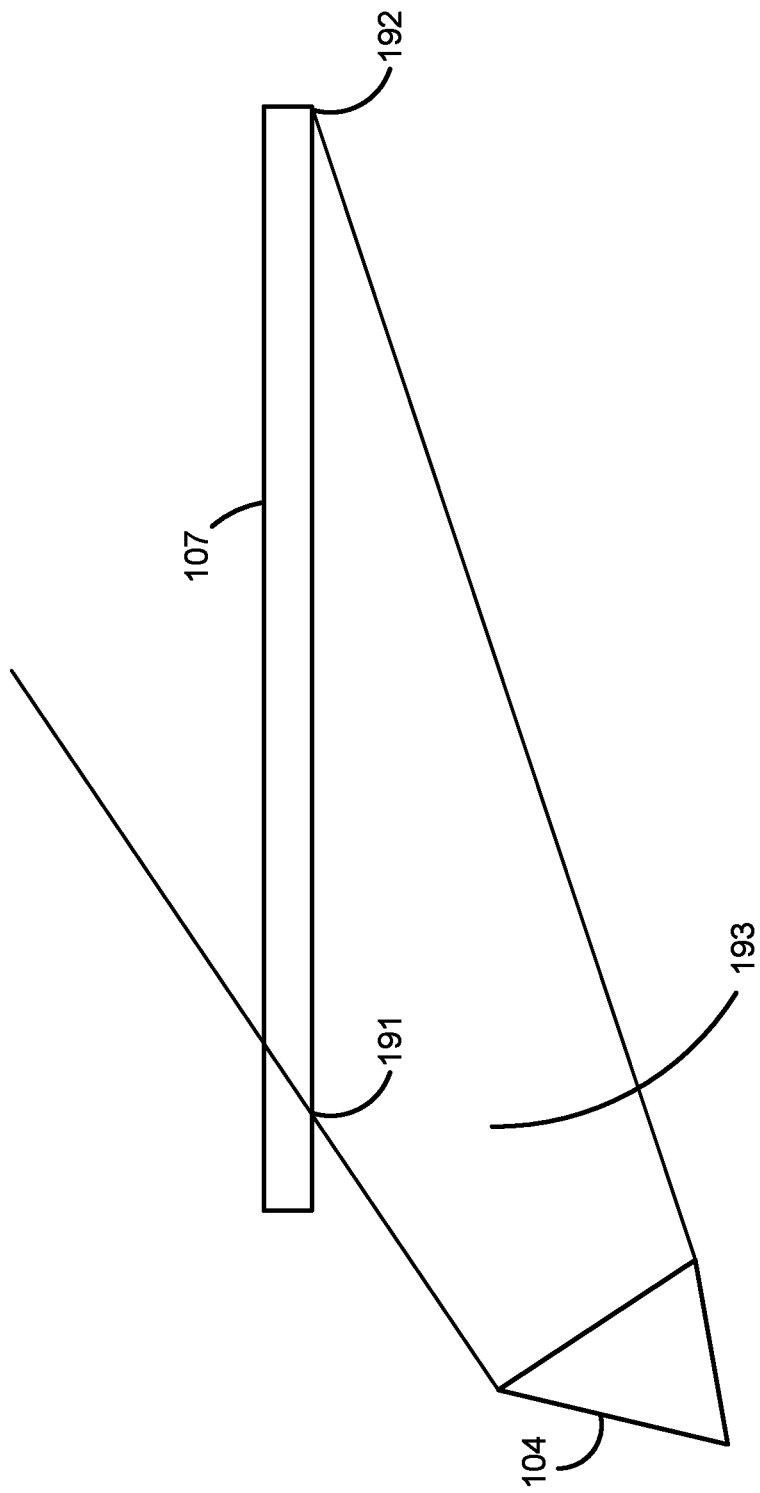
FIG. 10 is a block diagram of triangular reflected beam of the CW Lidar system of FIG. 9.

Thus, if the pyramidal reflective element 104 is used with a divergent beam to illuminate surfaces sitting above the reflective element 104 (e.g., given the depicted orientation), the triangular beam pattern 193 from the reflective element 104 can be made to illuminate near range portions of the surface of the target 107 via the apex of the triangular beam pattern, as illustrated with near range reference 191 in FIG. 10. And, the more distant portions of the surface of the target 107 can be illuminated with the base of the beam pattern, as illustrated with far range reference 192 in FIG. 10. In such a configuration, the altitude of a scattered target 107 maps to a direction that is orthogonal to the direction representing range on the image plane of the detector 109, providing additional information that can be used to enhance the detection of targets.

The present embodiments may be used for many applications and are not intended to be limited to detecting positions of hard targets. For example, using Differential Absorption Lidar (DiAL) techniques, the laser may be tuned on and off of an absorption line of a material or gas that is to be located. With collection of range dependent signal returns from multiple wavelengths with different absorptions for the detected species, the spatial distribution of the species within the sensed volume can be determined. The present embodiments provide a well suited sensing mechanism for range dependent Lidar returns for DiAL analysis and post processing. And, since atmospheric measurements typically do not require high resolution range measurements, spin rates for the scanning reflective element 104 can be made lower.

Moreover, DiAL sensing generally requires specialized narrow linewidth lasers that can be implemented with tunable diode lasers. But, conventional Lidar systems employ relatively high peak powers that cannot easily be attained with current semiconductor technology. This requisite combination of wavelength and peak power typically results in very expensive and complex laser systems. Using the present embodiments, a CW laser with moderate power can be configured from relatively simple/cheap semiconductor lasers.

In some embodiments, the Lidar system 100 can be used for detection of received wavelengths that differ from the transmitted wavelengths via fluorescence Lidar techniques and Raman Lidar techniques. Though primarily targeted towards the use of CW lasers (with possible wavelength modulation for DiAL applications), the present embodiments may also use a modulated laser to improve range resolution. For example, each pixel within the detector array of the detector 109 can be considered as sensing a volume. Time-delayed modulation at a particular pixel may be detected to refine a range measurement that is not spatially resolvable within the image plane of the detector 109.

Because each pixel detects a volume that is limited in range extent, very high laser PRFs may be used without running into ambiguous range constraints.

In some embodiments, limited sensing volumes of each pixel in the detector 109 inherently reduces signal interference found in larger volumes. For example, if SPADS are used for detection, the detection of a photon results in a dead time for the detector (e.g., 35 ns). When implemented in conventional Lidar, a backscatter event from near range scatterers can make a SPAD based detector blind to a more significant target a few feet further in range. In the current embodiments, however, different ranges get mapped to different pixels in the image plane of the detector 109, limiting the potential for near range interference.

Figure 11:
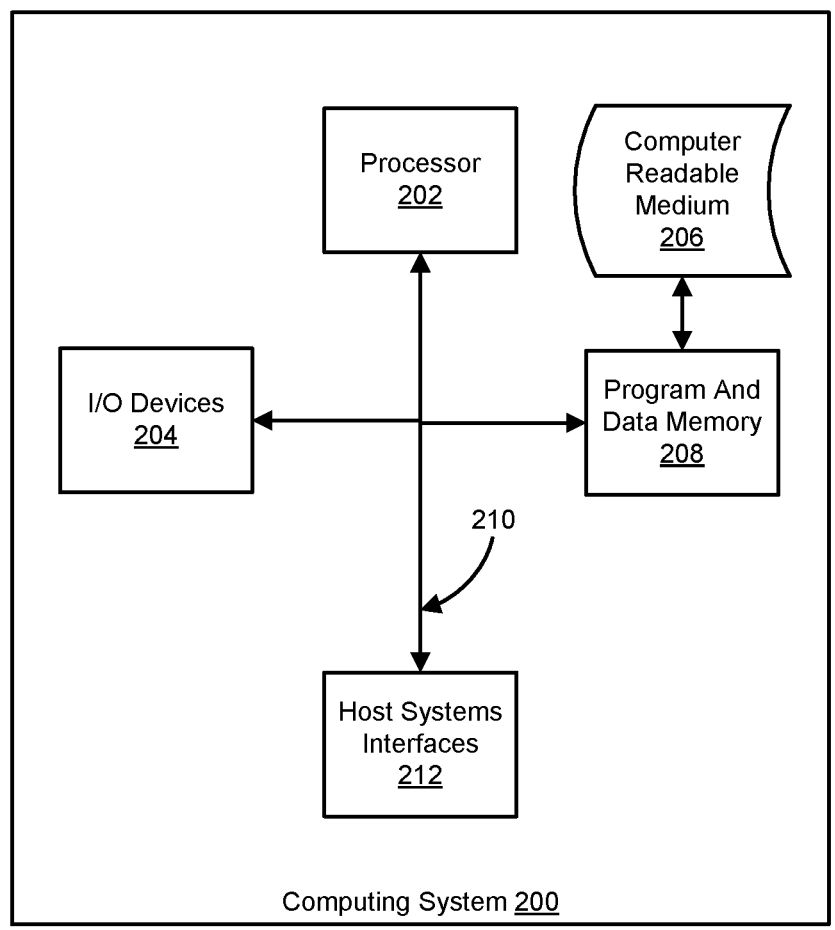
FIG. 11 is a block diagram of an exemplary computing system in which a computer readable medium provides instructions for performing methods herein.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements. In one embodiment, portions of the invention are implemented in software (e.g., the processing by the processor 110), which includes but is not limited to firmware, resident software, microcode, etc. FIG. 11 illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output or I/O devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

What is claimed is:

1. A Laser Ranging and Detection (Lidar) system, comprising: a laser configured to propagate laser light in a conical pattern; a rotating scanner configured to receive returns of the laser light from a target; and a processor configured to calculate a range and an angle to the target using an angular displacement of the scanner that arises from an angular velocity of the scanner.

2. The Lidar system of claim 1, wherein:
the scanner rotates at a first speed; and
the Lidar system further comprises:
an optical element rotated at a second speed that is proportional to the first speed of the scanner to make range displacement line images substantially stationary.

3. The Lidar system of claim 2, wherein:
the second speed is substantially half the first speed.

4. The Lidar system of claim 1, wherein:
the scanner comprises at least one of: a pyramidal mirror; a flat scan mirror; or an off-axis parabolic mirror.

5. The Lidar system of claim 1, wherein:
the laser light comprises CW laser light.

6. The Lidar system of claim 1, wherein:
the laser light comprises pulsed laser light.

7. The Lidar system of claim 1, further comprising:
a detector comprising an array of detector elements,
wherein the processor is further configured to determine the range to the target based on spatial displacement of received laser light across the detector elements.

8. The Lidar system of claim 7, wherein:
the array of detector elements is a linear array of detector elements.

9. The Lidar system of claim 1, wherein:
the transmitted laser light is tuned on and off of an absorption line of the target.

10. The Lidar system of claim 1, wherein:
the target is a hard target.

11. The Lidar system of claim 1, wherein:
the target comprises a volume of distributed scatterers.

12. The Lidar system of claim 11, further comprising:
a detector configured to detect a wavelength of received laser light that differs from a wavelength of the transmitted laser light due to the distributed scatterers.

13. A Laser Ranging and Detection (Lidar) method, comprising: propagating laser light from a laser in a conical pattern; receiving returns of the laser light from a target via a rotating scanner; and calculating a range and an angle to the target using an angular displacement of the scanner that arises from an angular velocity of the scanner.

14. The Lidar method of claim 13, further comprising:
rotating the scanner at a first speed; and
rotating an optical element at a second speed that is proportional to the first speed of the scanner to make range displacement line images substantially stationary.

15. The Lidar method of claim 14, wherein:
the second speed is substantially half the first speed.

16. The Lidar method of claim 13, further comprising:
tuning the transmitted laser light on and off of an absorption line of the target.

17. A non-transitory computer readable medium comprising instructions that, when executed by a processor in a Laser Ranging and Detection (Lidar) system, direct the processor to: propagate laser light in a conical pattern; receive returns of the laser light returning to a rotating scanner from a target; and calculate a range and an angle to the target using an angular displacement of the scanner that arises from an angular velocity of the scanner.

18. The non-transitory computer readable medium of claim 17, further comprising instructions that direct the processor:
  rotate the scanner at a first speed; and
  rotate an optical element at a second speed that is proportional to the first speed of the scanner to make range displacement line images substantially stationary.

19. The non-transitory computer readable medium of claim 18, wherein:
  the second speed is substantially half the first speed.

20. The non-transitory computer readable medium of claim 17, further comprising instructions that direct the processor to:
  tune the transmitted laser light on and off of an absorption line of the target.

\* \* \* \* \*